(12) United States Patent
Kosugi et al.

(10) Patent No.: US 7,267,489 B2
(45) Date of Patent: Sep. 11, 2007

(54) SEALING ARRANGEMENT FOR ROLLING BEARING AND SPINDLE OF MACHINE TOOL

(75) Inventors: Futoshi Kosugi, Osaka (JP); Hiroshi Takiuchi, Osaka (JP)

(73) Assignee: NTN Corporation, Osaka (JP)

( * ) Notice: Subject to any disclaimer, the term of this patent is extended or adjusted under 35 U.S.C. 154(b) by 112 days.

(21) Appl. No.: 10/998,813

(22) Filed: Nov. 30, 2004

(65) Prior Publication Data

US 2005/0117824 A1 Jun. 2, 2005

(30) Foreign Application Priority Data

Dec. 2, 2003 (JP) ............................. 203-403237

(51) Int. Cl.
*F16C 19/49* (2006.01)
(52) U.S. Cl. ................................... 384/494
(58) Field of Classification Search ........... 384/473, 384/477, 494, 484, 488
See application file for complete search history.

(56) References Cited

U.S. PATENT DOCUMENTS 3,462,205 A * 8/1969 Darr et al. ............... 384/494

FOREIGN PATENT DOCUMENTS

JP 7-46815 10/1995

\* cited by examiner

*Primary Examiner*—Lenard A. Footland
(74) *Attorney, Agent, or Firm*—Wenderoth, Lind & Ponack, L.L.P.

(57) ABSTRACT

A bearing assembly includes a double-row cylindrical roller bearing having no seals and having a grease sealed in its internal space. A double-row angular ball bearing having seals is provided in juxtaposition with one end face of the double-row cylindrical roller bearing. During run-in, part of the grease sealed in the double-row cylindrical roller bearing adheres to the outer surface of one of the seals of the angular ball bearing that faces the internal space of the cylindrical roller bearing. This increases the initial amount of grease sealed in the internal space of the cylindrical roller bearing, thereby prolonging its life.

15 Claims, 5 Drawing Sheets

SEALING ARRANGEMENT FOR ROLLING BEARING AND SPINDLE OF MACHINE TOOL

BACKGROUND OF THE INVENTION

This invention relates to a seal arrangement for sealing a rolling bearing having no seals and having a grease sealed in its inner space, and a spindle of a machine tool which is supported by the rolling bearing sealed by the seal arrangement.

Rotary shafts of various industrial machines, such as spindles of machine tools, are supported by a plurality of rolling bearings or a single double-row rolling bearing for bearing radial loads and a plurality of rolling bearings or a single double-row rolling bearing for bearing axial loads. The rolling bearings are typically arranged in a row in a bearing housing. If such different types of rolling bearings are arranged in a bearing housing in a row, the bearing housing may be provided with a front cover for pressing the front end of the foremost rolling bearing and/or spacers may be disposed between adjacent bearings and/or between the rear end face of the rearmost bearing and the rear end wall of the bearing housing.

Rolling bearings for supporting rotary shafts of industrial machines have a grease sealed in their internal space. In some machine tools that need run-in before a high-speed normal run, such as lathes, excess grease is sealed in the bearing inner space before run-in. After run-in, any excess grease not forming a thin film on the internal surfaces of the bearing is removed because such unstable grease, which is present in relatively large masses in the bearing inner space, tends to get stuck between rolling elements or between rolling elements and other bearing members all at once during a normal run of the bearing, thereby suddenly increasing the resistance to the rolling motion of the rolling elements during a high-speed normal run of the bearing. This may lead to abnormal temperature rise in the bearing.

The amount of grease that forms the thin film on the bearing internal surfaces after run-in is no more than 10% of the volume of the bearing internal space. The grease forming the thin film after run-in is gradually supplied to the rolling surfaces of the rolling elements during a high-speed normal run of the bearing. But because the initial amount of grease forming the thin film after run-in is relatively small as mentioned above, the supply of grease to the rolling surfaces tends to run short soon. This may shorten the life of the bearing.

As a countermeasure for this problem, many conventional ball bearings use a seal mounted to the outer ring. With this arrangement, the inner surface of the seal adds to the total internal surface area of the bearing on which the grease forms the thin film, thereby increasing the initial amount of grease sealed in the bearing after run-in. The seal is mounted to the outer ring so that the seal also serves to prevent leakage of grease, which tends to move radially outwardly under centrifugal force during a normal run of the bearing.

Some conventional cylindrical roller bearings also have a similar seal mounted to the outer ring (as disclosed in JP utility model publication 7-46815). But practically, such cylindrical roller bearings are extremely unpopular. This is because an end user has to separate the outer ring of a cylindrical roller bearing to adjust the radial bearing clearance before assembling. A seal mounted to the outer ring therefore tends to be a major obstacle. Moreover, such a seal tends to be damaged during transportation due to displacement of the bearing parts.

It is therefore acutely desired and is an object of the present invention to increase the initial amount of grease sealed in the bearing internal space without the need to mount a seal to the outer ring, thereby prolonging the bearing life.

SUMMARY OF THE INVENTION

According to the invention, there is provided a bearing assembly comprising a first rolling bearing having no seals and having an internal space in which is sealed a grease, and a second rolling bearing provided in juxtaposition with one end face of the first rolling bearing, the second bearing having at least one seal near the one end face of the first rolling bearing.

With this arrangement, grease in the first rolling bearing adheres to the axially outer surface of the at least one seal of the second rolling bearing. This increases the initial amount of grease sealed in the first rolling bearing after run-in, which will in turn prolong the life of the first rolling bearing.

From another aspect of the invention, there is provided a bearing assembly comprising a first rolling bearing having no seals and having an internal space in which is sealed a grease, a second rolling bearing provided in juxtaposition with one end face of the first rolling bearing, and a ring-shaped seal plate disposed between the one end face of the first rolling bearing and the second rolling bearing.

With this arrangement, grease in the first rolling bearing adheres to the surface of the ring-shaped seal plate facing the internal space of the first rolling bearing. This increases the initial amount of grease sealed in the first rolling bearing after run-in, which will in turn prolong the life of the first rolling bearing.

From still another aspect of the invention, there is provided a bearing assembly comprising a rolling bearing having no seals and having an internal space in which is sealed a grease, and a cover or a spacer provided in juxtaposition with one end face of the rolling bearing, the cover or the spacer having a surface facing the internal space of the rolling bearing and formed with a recess extending the entire circumference of the surface.

With this arrangement, grease in the rolling bearing is retained in the recess. This increases the initial amount of grease sealed in the rolling bearing after run-in, which will in turn prolong the life of the first rolling bearing.

Preferably, the rolling bearing having no seals is a single-row angular ball bearing or a double-row cylindrical roller bearing.

Preferably, the grease sealed in the internal space of the first rolling bearing is in the amount of 10-35 percent of the volume of the internal space. If this figure is below 10%, sufficient lubrication with grease will be difficult during a high-speed normal run of the bearing. If grease is contained in an amount exceeding 35%, grease tends to get stuck between rolling elements or between rolling elements and other bearing parts, thereby increasing, rather than decreasing, the rolling resistance.

The bearing assembly according to the present invention is used most advantageously to support a spindle of a machine tool.

BRIEF DESCRIPTION OF THE DRAWINGS

Other features and objects of the present invention will become apparent from the following description made with reference to the accompanying drawings, in which.

DETAILED DESCRIPTION OF THE PREFERRED EMBODIMENTS

Figure 1:
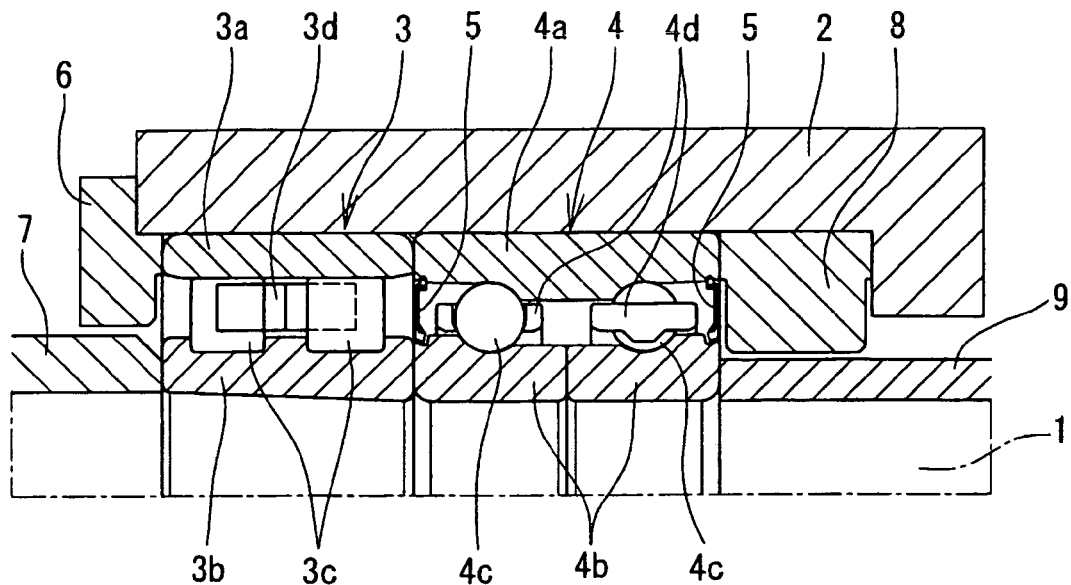
FIG. 1 is a longitudinal sectional view of a bearing assembly of a first embodiment of the present invention, as used to support a spindle of a machine tool.
Figure 2:
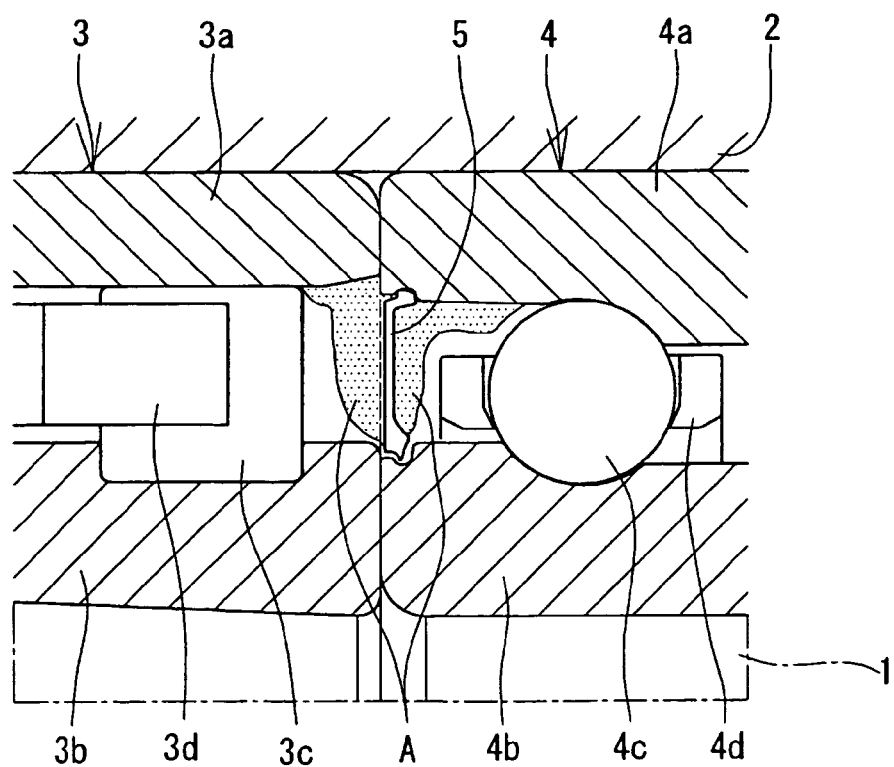
FIG. 2 is a partial enlarged sectional view of the same.

Now referring to the drawings, the first embodiment, shown in FIGS. 1 and 2, is a bearing assembly supporting a spindle 1 of a machine tool. The bearing assembly includes a double-row cylindrical roller bearing 3 mounted in a bearing casing 2 for bearing radial loads and a double-row angular ball bearing 4 mounted in the bearing casing 2 in the rear of the bearing 3 for bearing axial loads. The double-row cylindrical roller bearing 3 has no seals. The double-row angular ball bearing 4 has seals 5 mounted to its outer ring 4a.

The double-row cylindrical roller bearing 3 includes an outer ring 3a having its front end face pressed against a front cover 6 of the bearing casing 2, and an inner ring 3b having a tapered bore in which is received the spindle 1 and pressed against a sleeve 7 fitted on the spindle 1. Double-row cylindrical rollers 3c are retained by a retainer 3d. The double-row angular ball bearing 4 has its outer ring 4a pressed against the rear end wall of the bearing casing 2 through a spacer 8, and further includes an inner ring 4b split into two separate parts which are held in position by a presser ring 9 so as not to slip off of the spindle 1. The double-row balls 4c are retained by retainers 4d.

During run-in of the machine tool, as shown in FIG. 2, grease A adheres not only to the radially inner surfaces of both of the outer rings 3a and 4a, but to the axially inner surfaces of both seals 5 of the double-row angular ball bearing 4 and the axially outer surface of the front seal 5. Any excess grease A that does not adhere to these bearing parts is removed after run-in. The axially outer surface of the front seal 5 of the angular ball bearing 4 adds to the total surface area to which grease A in the cylindrical roller bearing 3 can adhere. This increases the initial amount of grease A sealed in the seal-less double-row cylindrical roller bearing 3 as well as the initial amount of grease sealed in the double-row angular bearing 4.

Figure 3:
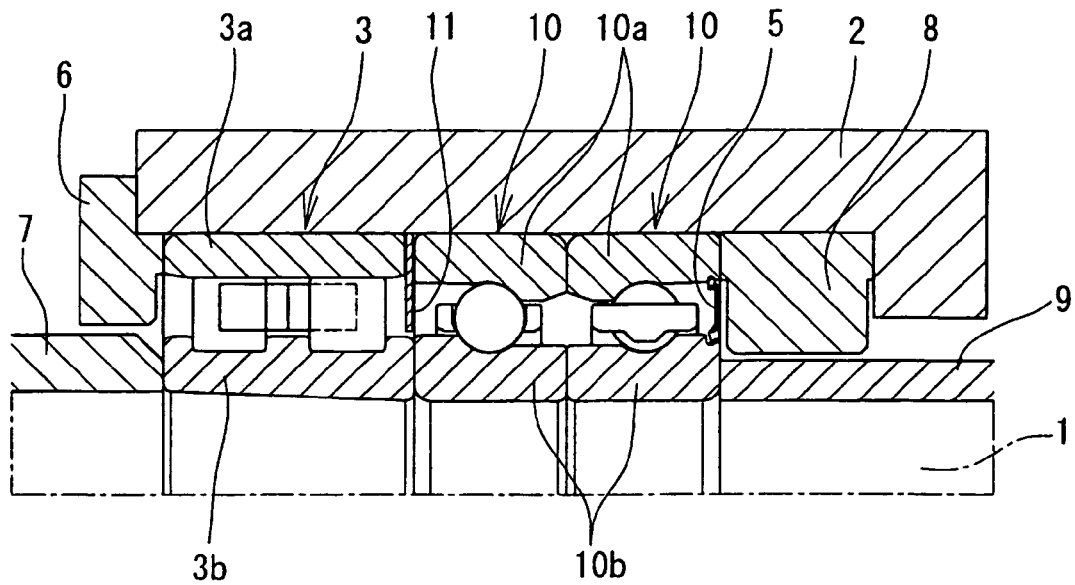
FIG. 3 is a longitudinal sectional view of a bearing assembly of a second embodiment of the present invention, as used to support a spindle of a machine tool.
Figure 4:
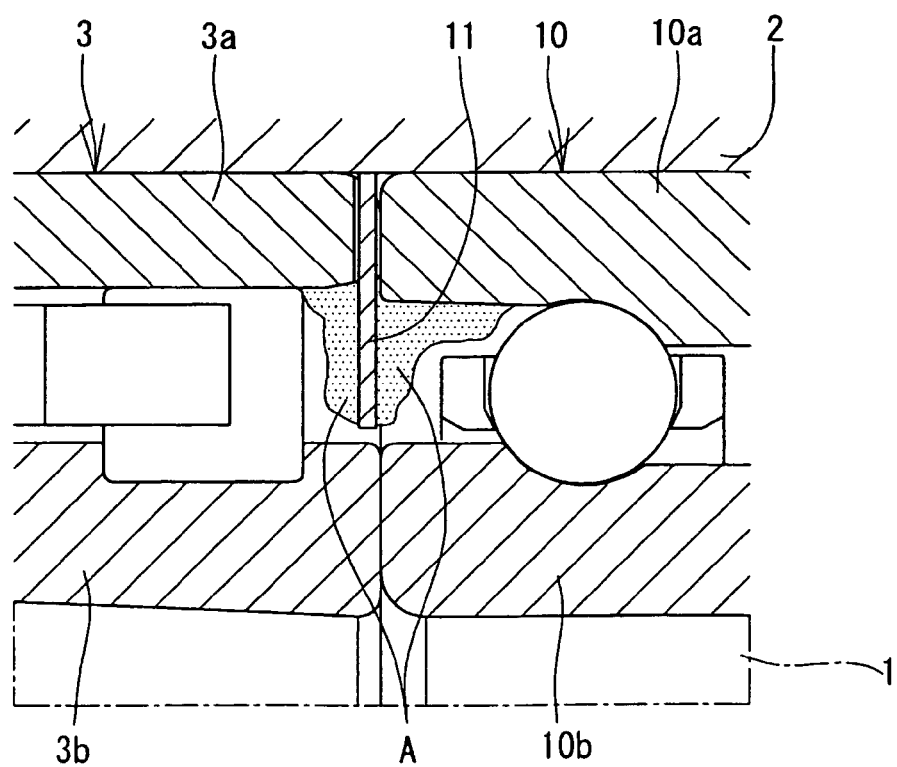
FIG. 4 is a partial enlarged sectional view of FIG. 3.

FIGS. 3 and 4 show the second embodiment, which differs from the first embodiment in that instead of the single double-row angular ball bearing 4, two single-row angular ball bearings 10 are used, and that instead of the front seal 5, a ring-shaped seal plate 11 is disposed between the seal-less double-row cylindrical roller bearing 3 and the front single-row angular ball bearing 10. Otherwise, this embodiment is identical to the first embodiment. That is, the rear seal 5 is provided at the rear end of the rear single-row angular bearing 10, the rear single-row angular bearing 10 is pressed against the rear end wall of the bearing casing 2 through the spacer 8, and its inner ring 10b is held in position by the presser ring 9 so as not to slip out of the spindle 1.

In this embodiment, during run-in of the machine tool, grease A adheres not only to the radially inner surfaces of the outer rings 3a and 10a, but to both sides of the seal plate 11 (see FIG. 4). This increases the initial amount of grease A sealed in the seal-less double-row cylindrical roller bearing 3 and the initial amount of grease A sealed in the front, seal-less single-row angular ball bearing 10, as well as the initial amount of grease sealed in the rear single-row angular ball bearing 10, which has the seal 5.

Figure 5:
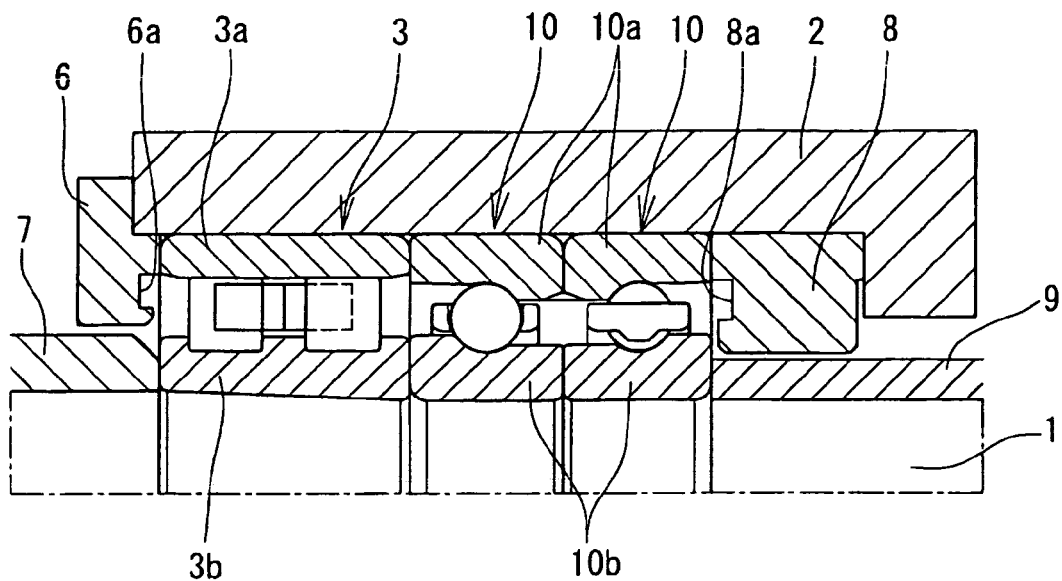
FIG. 5 is a longitudinal sectional view of a bearing assembly of a third embodiment of the present invention, as used to support a spindle of a machine tool.
Figure 6A:
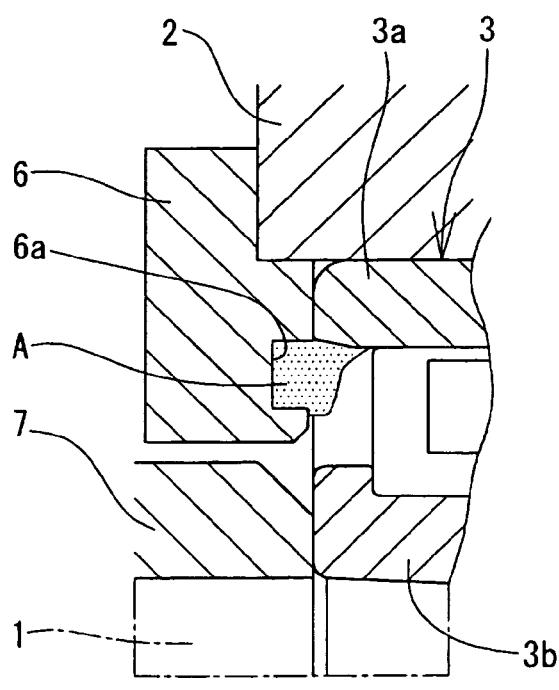
FIGS. 6A and 6B are partial enlarged sectional views of FIG. 5.
Figure 6B:
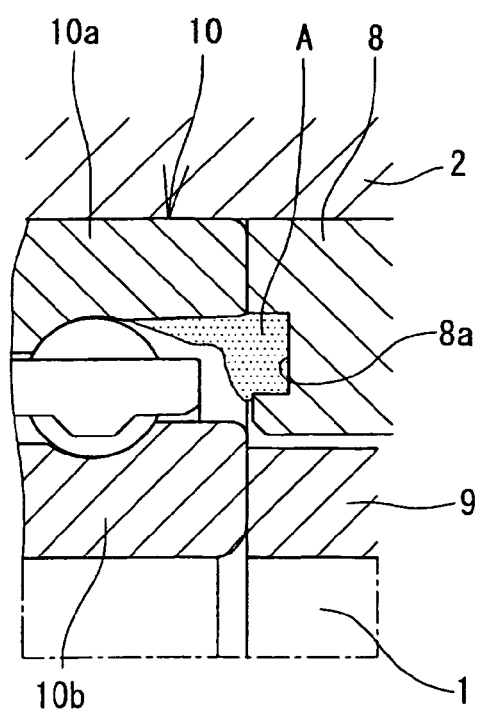

FIGS. 5 and 6 show the third embodiment, which differs from the second embodiment in that none of the double-row cylindrical roller bearing 3 and the two single-row angular ball bearings 10 has a seal, and that recesses 6a and 8a are formed in the axially inner surface of the front cover 6, i.e. its surface facing the internal space of the double-row cylindrical roller bearing 3, and the surface of the spacer 8 facing the internal space of the rear single-row angular ball bearing 10, respectively, so as to extend the entire circumference of the respective surfaces. Otherwise, the third embodiment is identical to the second embodiment.

In this embodiment, during run-in of the machine tool, grease A partially adheres to the radially inner surfaces of the outer rings 3a and 10a and is partially retained in the recesses 6a and 8a of the cover 6 and the spacer 8. This increases the initial amounts of grease A sealed in the seal-less double-row cylindrical roller bearing 3 and in the seal-less single-row angular ball bearings 10.

[Evaluation Tests]

Under the following conditions, the bearing assembly of the second embodiment, shown in FIG. 3, was run by rotating the spindle 1 at high speed with grease sealed in the internal space of the seal-less angular ball bearing 10 in different amounts, and the difference in temperature of the outer ring 10a of the seal-less angular ball bearing 10 before and after each test was determined. The seal-less angular bearing 10 measured 70 mm in inner diameter, 110 mm in outer diameter and 20 mm wide.

Amount of grease sealed (in terms of percentage relative to the volume of the internal space of the seal-less angular bearing 10): 15, 25 and 35% rpm: 3000, 6000, 9000 12000 and 15000 rpm

In each test, the bearing assembly was continuously run for 24 hours with no external cooling.

Figure 7:
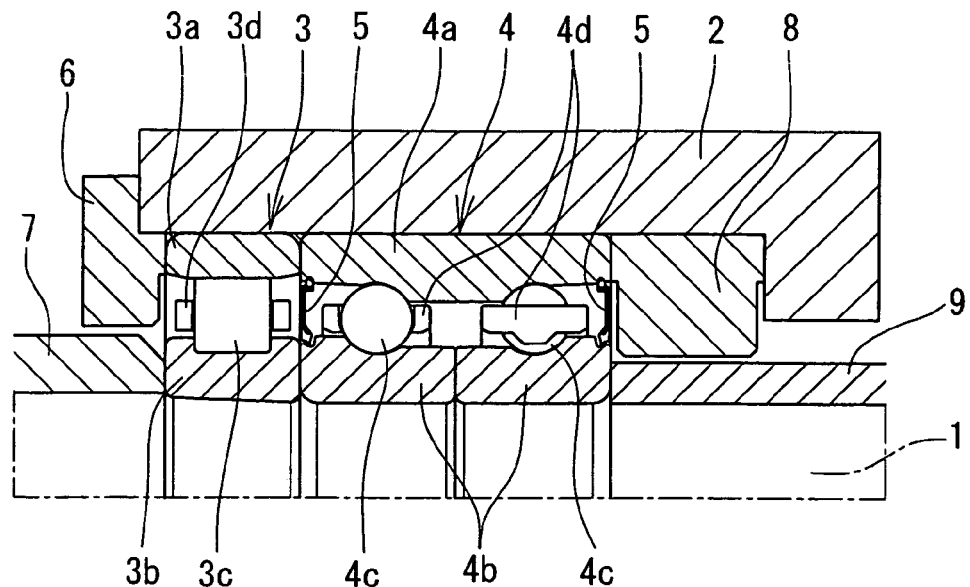
FIG. 7 is a longitudinal sectional view of a bearing assembly having a single-row cylindrical roller bearing.
Figure 8:
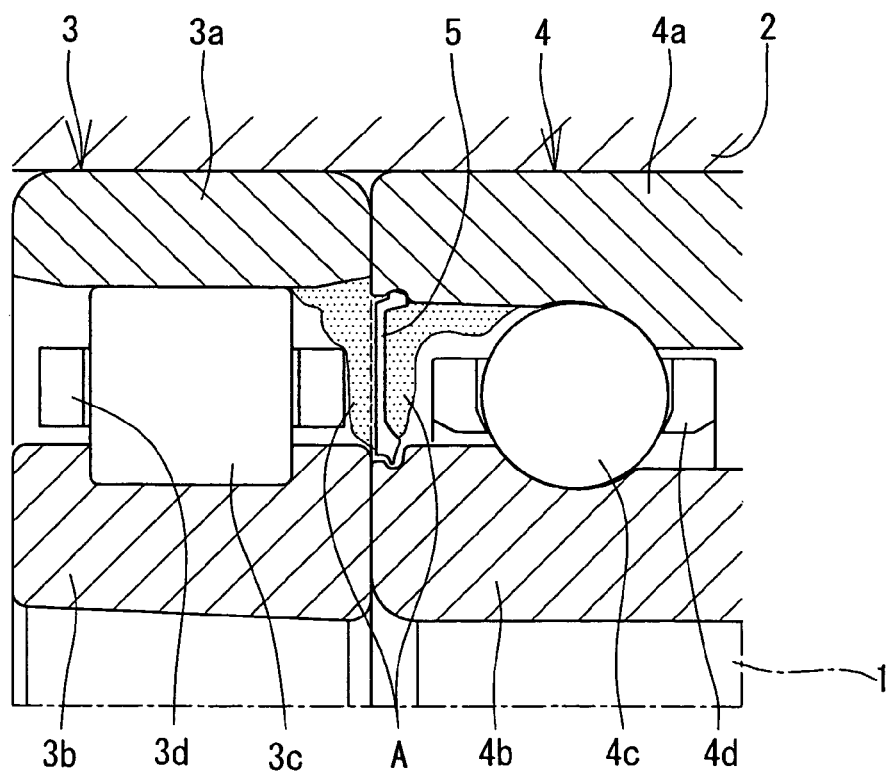
FIG. 8 is a partial enlarged sectional view of the same.

FIGS. 7 and 8 show another embodiment of a bearing assembly which includes a single-row cylindrical roller bearing 3 instead of the double-row cylindrical roller bearing 3 of FIG. 1. While not shown, the double-row cylindrical roller bearing 3 of the second or third embodiment may also be replaced with a single-row cylindrical roller bearing as shown in FIG. 7.

Figure 9:
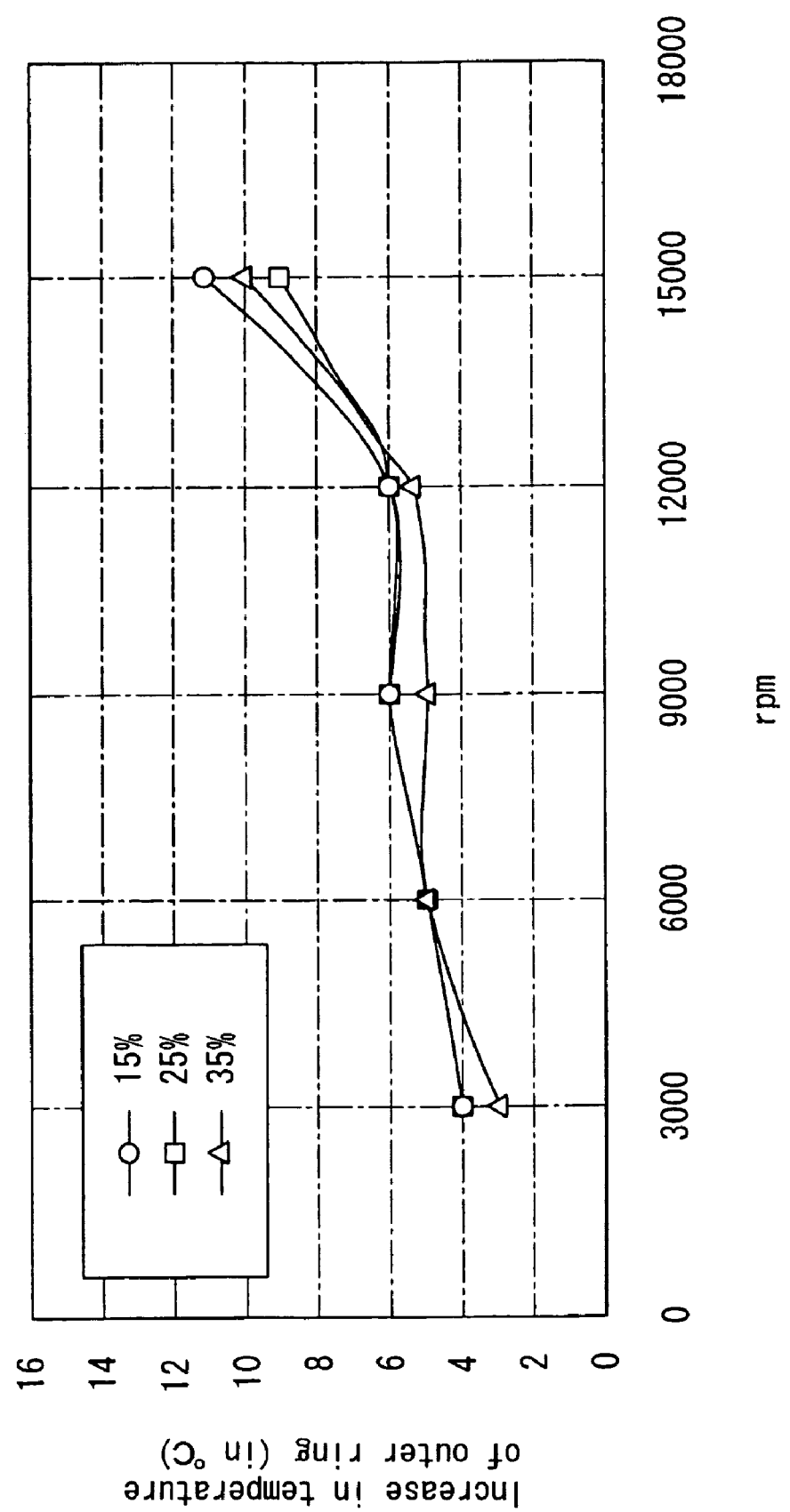
FIG. 9 is a graph showing the difference in temperature of the outer ring of an angular ball bearing according to the present invention before and after the spindle of a machine tool shown in FIG. 3 is rotated at different speeds.

FIG. 9 shows the test results. As shown, the difference in temperature of the outer ring of the seal-less angular ball bearing before and after any of the test is around 10 degrees Celsius, which is a negligibly small value. The test results thus clearly indicate that grease did not get stuck between any adjacent rolling elements or between any rolling elements and other bearing parts even when the amount of grease sealed was increased to 35%, which is far higher than the conventional upper limit, i.e. mere 10%. The bearing assembly according to the present invention can therefore be stably run for a prolonged period of time.

It is to be noted that the concept of the present invention is applicable not only to the combinations of bearings shown, i.e. a combination of a double-row cylindrical roller bearing and a double-row angular ball bearing, and a combination of a double-row cylindrical roller bearing and two single-row angular ball bearings, but to any other combination of bearings. The front cover and/or the spacer may be omitted, too. The bearing assembly according to the present invention can be used not only to rotatably support the spindle of a machine tool, but also to rotatably support the rotary shaft of any other industrial machine.

What is claimed is:

1. A bearing assembly comprising:
   a first rolling bearing having no seals and having an internal space in which is sealed a grease, said first rolling bearing having first and second axial ends;
   a second rolling bearing having first and second axial ends;
   wherein said first axial end of said second rolling bearing is disposed axially adjacent to said second axial end of said first rolling bearing;
   wherein said second axial end of said second rolling bearing is disposed axially remote from said second axial end of said first rolling bearing; and
   wherein a seal is disposed at said first axial end of said second rolling bearing.

2. The bearing assembly of claim 1 wherein said first rolling bearing is one of a single-row cylindrical roller bearing and a double-row cylindrical roller bearing.

3. The bearing assembly of claim 2 wherein the grease sealed in said internal space of said first rolling bearing is in the amount of 10-35 percent of the volume of said internal space.

4. A spindle of a machine tool supported by the bearing assembly of claim 2.

5. The bearing assembly of claim 2, wherein said seal is arranged for sealing grease in each of said first rolling bearing and said second rolling bearing.

6. The bearing assembly of claim 2, wherein said seal constitutes a first seal; and a second seal is disposed at said second axial end of said second rolling bearing.

7. The bearing assembly of claim 1 wherein the grease sealed in said internal space of said first rolling bearing is in the amount of 10-35 percent of the volume of said internal space.

8. A spindle of a machine tool supported by the bearing assembly of claim 7.

9. The bearing assembly of claim 7, wherein said seal is arranged for sealing grease in each of said first rolling bearing and said second rolling bearing.

10. The bearing assembly of claim 7, wherein said seal constitutes a first seal; and a second seal is disposed at said second axial end of said second rolling bearing.

11. A spindle of a machine tool supported by the bearing assembly of claim 1.

12. The bearing assembly of claim 1, wherein said seal is arranged for sealing grease in each of said first rolling bearing and said second rolling bearing.

13. A spindle of a machine tool supported by the bearing assembly of claim 12.

14. The bearing assembly of claim 1, wherein said seal constitutes a first seal; and a second seal is disposed at said second axial end of said second rolling bearing.

15. A spindle of a machine tool supported by the bearing assembly of claim 14.

* * * * *